United States Patent [19]

Palleiko

[11] Patent Number: 4,931,962
[45] Date of Patent: Jun. 5, 1990

[54] FIXTURE AND NONREPEATABLE ERROR COMPENSATION SYSTEM

[75] Inventor: Benjamin Palleiko, Stoughton, Mass.

[73] Assignee: ADE Corporation, Newton, Mass.

[21] Appl. No.: 193,958

[22] Filed: May 13, 1988

[51] Int. Cl.$^5$ .................... G01B 7/00; G01C 25/00
[52] U.S. Cl. ................... 364/550; 364/571.01; 73/105
[58] Field of Search .............. 364/550, 551.01, 571.01, 364/571.05; 73/104, 105; 33/549–552

[56] References Cited

U.S. PATENT DOCUMENTS

| | | | |
|---|---|---|---|
| 3,641,444 | 2/1972 | Watts | 364/571.05 |
| 3,694,741 | 9/1972 | Abbe | 324/60 |
| 3,706,919 | 12/1972 | Abbe | 361/278 X |
| 3,771,051 | 11/1973 | Abbe | 324/61 |
| 3,775,678 | 11/1973 | Abbe | 324/60 |
| 3,775,679 | 11/1973 | Abbe | 324/61 |
| 3,805,150 | 4/1974 | Abbe | 324/61 R |
| 3,812,424 | 5/1974 | Abbe | 324/61 |
| 3,815,111 | 6/1974 | Abbe | 340/213 |
| 3,986,109 | 10/1976 | Poduje | 324/61 |
| 3,990,005 | 11/1976 | Abbe et al. | 324/61 |
| 3,996,517 | 12/1976 | Fergason et al. | 324/158 P |
| 4,158,171 | 6/1979 | Abbe et al. | 324/158 |
| 4,165,523 | 8/1979 | Hathaway | 360/77 |
| 4,217,542 | 8/1980 | Abbe et al. | 324/57 |
| 4,228,392 | 10/1980 | Abbe et al. | 324/61 |
| 4,280,354 | 7/1981 | Wheeler et al. | 73/105 X |
| 4,298,273 | 11/1981 | Nishizuka et al. | 355/61 |
| 4,328,553 | 5/1982 | Fredriksen et al. | 364/559 |
| 4,353,029 | 10/1982 | Abbe et al. | 324/236 |
| 4,365,301 | 12/1982 | Arnold et al. | 364/475 |
| 4,457,664 | 7/1984 | Judell et al. | 414/779 |
| 4,560,924 | 12/1985 | Nordberg | 73/105 X |
| 4,565,097 | 1/1986 | Dimeff | 73/765 |
| 4,590,527 | 5/1986 | Warner | 360/78 |
| 4,612,709 | 9/1986 | Baisch et al. | 33/125 R |
| 4,628,239 | 12/1986 | Everett, Jr. | 318/685 |
| 4,646,009 | 2/1987 | Mallory | 324/158 |
| 4,692,695 | 9/1987 | Poduje | 324/158 |
| 4,750,141 | 6/1988 | Judell et al. | 364/550 |

OTHER PUBLICATIONS

U.S. Patent Application Serial No. 07/282,877; filed 12/9/88, Entitled: Wafer Flatness Station, Inventors: Judell, et al.

U.S. Patent Application Serial No. 06/729,166, filed 4/30/85, Entitled: Object Measurement System and Method, Inventors: Abbe, et al.

U.S. Patent Application Serial No. 07/051,090, filed 5/15/87, Entitled: Rotary to Linear Motion Robot Arm, Inventors: Abbe, et al.

U.S. Continuation Patent Application Serial No. 07/282,474, filed 12/9/88, Entitled: Rotary to Linear Motion Robot Arm, Inventors: Abbe, et al.

U.S. Patent Application Serial No. 07/109,239, filed 10/15/87, Entitled: Gauging System with Nonlinearity Correction, Inventors: Poduje, et al.

*Primary Examiner*—Felix D. Gruber
*Assistant Examiner*—Joseph L. Dixon
*Attorney, Agent, or Firm*—Weingarten, Schurgin, Gagnebin & Hayes

[57] ABSTRACT

In a sensing system having relatively movable fixture and sample elements in which measured data is corrupted in proportion to the departure of the fixture from its ideal position, as from mechanical intolerances, etc., a reference disc and reference sensor are disclosed. The reference sensor and disc are provided for measuring the non-repeatable departure from ideal so that the measured data can be compensated thereby in real time for the error thereby improving the accuracy of the measured data. This system is operable in combination with a repeatable error elimination system insuring complete error removal.

20 Claims, 1 Drawing Sheet

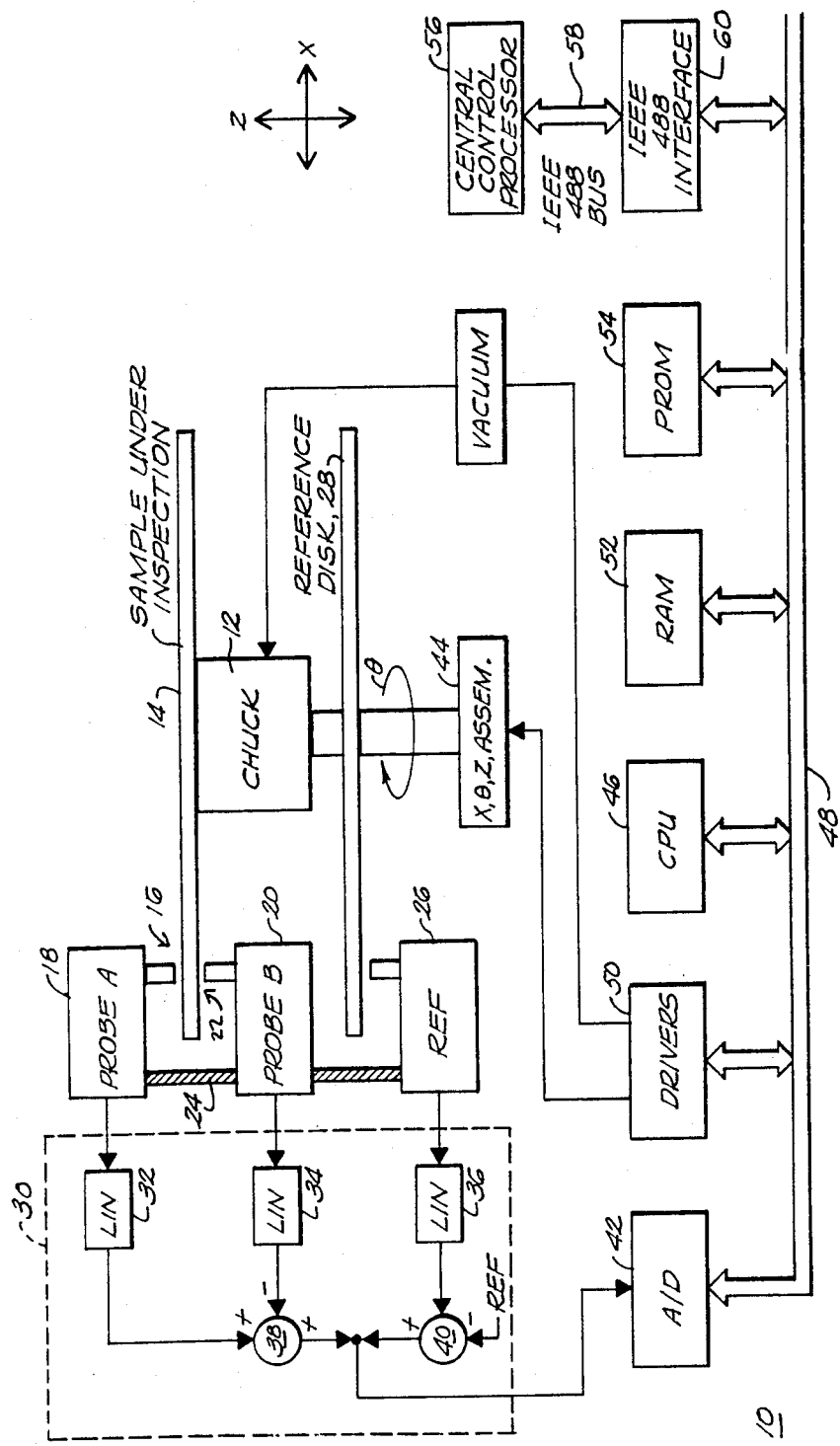

FIXTURE AND NONREPEATABLE ERROR COMPENSATION SYSTEM

FIELD OF THE INVENTION

The present invention is directed to the field of measurement and testing, and more particularly, to a novel system for compensating measurement data for error introduced into the measurement data mechanically by the fixture moving the object from which the measurement data is obtained.

BACKGROUND OF THE INVENTION

The flatness, bow, warp and other qualities of semiconductor wafers must be within precise standards in order for the wafers to be usable. Individual wafers are measured to determine whether and the extent of conformance to such standards. Errors are, however, introduced into the measurements by the mechanical errors of the fixtures holding the wafers, thereby limiting the accuracy of the wafer measurement. One solution in high accuracy scenarios is the use of wafer test fixtures that are so precisely fabricated as to exhibit substantially no error themselves. This solution is disadvantageous, however, due to the limited processing throughput that such devices often entail and due to the expenses that are associated with providing and maintaining such test fixtures. Another solution is to electronically process the measurement data to compensate the measurement data for the fixture induced errors to the extent that they are repeatable. In commonly assigned copending U.S. utility patent application Ser. No. 802,049, incorporated herein by reference, now U.S. Pat. No. 4,750,141 method and apparatus are disclosed for separating fixture errors from measured data, and for compensating the measured data for the error introduced by the fixture error. In a bow and warp station embodiment thereof, an X, θ, and Z movable fixture is calibrated to determine its X and θ fixture induced errors that repeat measurement cycle to measurement cycle. Once the fixture is calibrated, the measurement data is therewith compensated providing an accuracy not limited by the repeatable X, θ errors associated with the mechanical nature of the fixture.

SUMMARY OF THE INVENTION

The present invention contemplates as its principal object a measurement system that separates non-repeatable fixture associated errors from measured data and that compensates the measured data for the non-repeatable fixture induced errors thereby improving the accuracy of the measured data. A sample to be measured receiving fixture in accordance with the present invention includes a movable fixture to which the sample is releasably mounted. A reference is mounted for movement with the movable fixture. A first sensor provides a measurement signal as the sample is moved thereto by the movable fixture, and a second sensor provides an error signal as the reference is moved thereto by the movable fixture as it moves the sample to the first sensor. In this manner, for each sample point that the first sensor provides a measurement signal for the second sensor provides an error signal from the corresponding point on the reference. The measurement signal and the error signal are combined to compensate the measurement signal for the non-repeatable error signal providing a high accuracy output signal. In a presently preferred embodiment, the output signal is digitized, compensated for non-repeatable error, then processed to provide the one or more desired characteristics associated with the object with a very high degree of accuracy. In combination with the system for the elimination of repeatable error, complete error compensation is achieved.

BRIEF DESCRIPTION OF THE DRAWINGS

These and other objects, aspects and advantages of the present invention will become apparent as the invention becomes better understood by referring to the following solely exemplary and non-limiting detailed description of a preferred embodiment thereof and to the drawings, wherein:

The sole FIGURE is a diagram illustrating a presently preferred embodiment of a measurement fixture and non-repeatable error compensation system according to the present invention.

DETAILED DESCRIPTION OF THE INVENTION

The present invention has utility in applications where the sample to be measured is releasably held by a fixture that is cooperative with a sensor to move the sample and sensor relatively to provide measurement of the sample in the form of a sensor output signal from which one or more sample characteristics can be determined but which is subjected to error due to imperfection in the mechanical aspect of the fixture which corrupts the sensor output signal and thereby limits the accuracy of the determination of the desired characteristics. The present invention especially has utility in such situations where the fixture is movable to move the sample to the sensing head but is subject to instantaneous, spontaneous deviations that dislocate the fixture, and therewith the sample, from its intended spacial position thereby inducing error into the measured data provided by the sensing element. Therefore the present invention contemplates means for providing a reference representative of the ideal position of the fixture, means for measuring deviations of the fixture from the reference position, and means for compensating the measured data with the deviations from the ideal. In the preferred embodiment, the present invention is disclosed in the context of a X, θ, and Z movable vacuum chuck and cooperative capacitive sensing elements for measuring proximity to the sample from the probe. From the measured data such wafer characteristics as flatness and bow/warp are able to be readily obtained as will be appreciated by those skilled in the art. The invention in compensating the measurement data for fixture related error thus enables the providing of such characteristics with a very high degree of accuracy. Other applications and configurations as well are contemplated and are not to be limited by the purely exemplary presently preferred embodiment.

Referring now to the FIGURE, generally designated at 10 is a block diagram of a presently preferred embodiment of the fixture and non-repeatable error compensation system of the present invention. The system 10 includes a vacuum chuck 12 for removably holding a semiconductor wafer 14 (or other sample), and a sensor generally designated 16 positioned near the chuck 12 that is operative to measure the distance to a preselected surface of any region of the wafer 14 brought into operative proximity with the sensor. The wafer 14 has a characteristic to be determined from the measurements of the points thereof brought into the sensor 16, such as flatness and bow/warp profiles. The sensor 16 preferably consists of a first probe 18 designated "A", and a second spaced-apart probe 20 designated "B", defining in combination a measuring head generally designated 22. The probes 18, 20 are preferably capacitive sensors. Probe 18 is fixably mounted to a support 24. Probe 20 is fixably mounted to the same support 24. The probes 18, 20 may be moved relative to each other so that the size of the head 22 can be adjusted. A reference probe 26 is mounted to the same support 24 to which the probes 18, 20 are mounted. In this way, all of the several probes are stationary with respect to each other. Any suitable means for mounting the probes in such a manner can of course be employed. While any suitable probes 18, 20, 26 may be employed, it is preferred that the capacitive gauging system disclosed and claimed in commonly assigned U.S. Pat. No. 3,990,005 entitled Capacitive Thickness Gauging For Ungrounded Elements, incorporated herein by reference, be employed. A reference 28 is mounted for movement with one or more of the movement degrees of freedom to be described of the chuck 12. In one preferred embodiment, the reference 28 can be a metallic disc, mounted for movement in X, $\theta$ and Z with the chuck. In another preferred embodiment, the reference 28 can be a bar mounted for movement in X alone with the chuck. The reference probe 26 defines the ideal location of the chuck 12 through reference 28 and, as measured by the reference probe 26 provides an output reflecting the departure from that ideal. Analog signal conditioning and combining electronics illustrated by a dashed block 30 are coupled to the output of the probes 18, 20, 26. The electronics 30 may be in any suitable configuration to condition the analog output signal from the probes 18, 20, 26 in dependence on the type of the wafer characteristic to be determined and to combine them so as to compensate for the non-repeatable mechanical imperfections of the fixture. As will readily be appreciated by those skilled in the art, the combination of the probe 18, 20 signals is selected to conform to the desired characteristics of the wafer to be determined, as, for example, when added, wafer thickness is obtainable, and when differenced, distance to the median centerline of the wafer is obtainable. To provide high accuracy bow/warp profiles, for example, the combining and conditioning circuitry includes linearizers 32, 34, and 36 connected to the output of the probes 18, 20, and 26 respectively, and the outputs of the probes 18, 20 are differenced, as in an analog adder 38. To the output of the analog adder 38, the output of the reference probe is combined so as to compensate the measurement data in real time for the non-repeatable fixture errors thereby providing a compensated output signal. For the position of the reference probe and reference disc below the wafer as illustrated in the Figure, a mixing element 40 such as an analog adder is provided to subtract the output of the probe 26 from a reference level designated "REF" that is representative of nominal fixture position, deviations from which indicate that the vacuum chuck is performing mechanically in a way that departs from its ideal positional specification. The compensated output signal is received by an analog to digital converter 42.

An X, $\theta$, and Z assembly 44 is operatively connected to the vacuum chuck 12 for rotating the chuck about its axis $\theta$ radians, for moving the vacuum chuck along an X axis, and for moving the chuck along a Z axis. The X, $\theta$, and Z assembly 44 is responsive to a plurality of control signals produced by a processor 46 to controllably manipulate the chuck 12 to successively position different preselected points of the wafer 14 into proximity with the capacitance sensing head 22 in the X, $\theta$, and Z directions. The points are preferably selected for the exemplary bow/warp profile to cover the entire spacial extent of the wafer 14. While any suitable X, $\theta$, and Z assembly can be employed, it is preferred that the X, $\theta$, and Z assembly shown and described in commonly assigned U.S. Pat. No. 4,457,664 entitled Wafer Alignment Station, incorporated herein by reference, be employed. Any suitable movement pattern that manipulates the X, $\theta$, and Z assembly may be employed, and reference may be had to commonly assigned U.S. utility patent applications Ser. Nos. 572,695, abandoned in favor of continuing U.S. application Ser. No. 07/282,877 and 802,049, now U.S. Pat. No. 4,750,141 respectively entitled Wafer Flatness Station and Method and Apparatus For Separating Fixture-Induced Error From Measured Object Characteristics and For Compensating The Measured Object Characteristics With The Error, and A Bow/Warp Station Implementing Same, both incorporated herein by reference, for exemplary movement sequences. The processor 46 may be any suitable processor, and in the exemplary embodiment, is indicated to the fixture and is connected to the analog to digital converter 42 over a data and address bus 48. The processor 46 is operatively connected to the X, $\theta$, and Z assembly 44 over the bus 48 via conventional latched drivers 50. The processor 46 has RAM 52 and PROM 54 associated therewith in the usual manner. A central control processor 56 is preferably connected to the bus 48 via a communication link, preferably an IEEE 488 bus 58 and an IEEE 488 interface 60. The processor 46 is preferably slaved to the central control processor 56, although as will be appreciated, a single processor could be employed as well.

In operation, the X, $\theta$, and Z assembly 44 controllably moves the chuck 12 and thereby moves the wafer 14 received on the chuck 12 so as to bring different points of the wafer into the capacitive sensing head 22 for measurement. For each such point, the probes 18, 20 produce signals representative of the distance respectively to the corresponding confronting surface of the wafer at that particular point. The reference probe 26 is simultaneously operative to provide an output signal representative of distance to the corresponding surface of the reference 28 for each such wafer point. If the chuck is where it should be, the signal produced by the reference probe 26 will be equal to the nominal signal, but, if the chuck is spontaneously experiencing a non-repeatable error and is not in Z where it should be, the output of the probe 26 is correspondingly changed, which change is reflected by the adder 40 as an error component output signal. The signal conditioning and combining electronics 30 is operative to subtract the error component signal from the measurement signal in real time and as the signals are produced. The compensated output signal is then digitized via the analog to digital converter 42. As will be appreciated, the data so made available may be manipulated by the processor to provide one or more desired characteristics associated with the wafers, such as flatness and/or bow/warp. Reference may be had to the application Ser. No. 572,695 abandoned in favor of continuing U.S. application Ser. No. 07/282,877, entitled Wafer Flatness Station, for exemplary processing sequences and algorithms for providing exemplary flatness profiles of the wafer, and reference may be had to the application Ser. No. 802,049 now U.S. Pat. No. 4,750,141 entitled Method and Apparatus For Separating Fixture-Induced Error From Measured Object Characteristics and For Compensating The Measured Object Characteristics With The Error, and A Bow/Warp Station Implementing Same, for exemplary processing sequences and algorithms for providing bow/warp profiles of the wafer free of repeatable errors. Other sequences and algorithms for determining flatness, bow/warp and other wafer characteristics can of course be readily implemented by those skilled in the art.

The present invention removes the error induced into the measurement signals provided by the probes by non-repeatable deviations of the fixture from its ideal spatial specifications. The errors induced thereinto by repeatable deviations of the fixture from its ideal spatial specifications may be removed by the technology disclosed and claimed in the above incorporated application Ser. No. 802,049 now U.S. Pat. No. 4,750,141. In this way, complete error compensation of both the repeatable and the non-repeatable spatial dislocations in one or more of the degrees of movement freedom of the X, $\theta$, and Z assembly is accomplished and therewith data accuracy is greatly improved notwithstanding any non-idealities that may be associated with the mechanical imperfections and intolerances of the fixture.

Many modifications of the present invention will become apparent to those skilled in the art without departing from the scope of the following claims.

What is claimed is:

1. An error compensation system, comprising:
   a movable fixture to which a sample to be measured is releasably mounted;
   means coupled to said movable fixture for moving same over a range of movement;
   fixture position indicating means for providing a measurable reference indicative of ideal fixture position of said movable fixture, said fixture position indicating means being mounted for movement with the movable fixture in such a way that the measurable reference is moved by and with the movable fixture;
   means including a first sensor spaced from the movable fixture and within the range of movement of the movable fixture for providing a measurement signal representative of a characteristic associated with the sample as the sample is moved relative to the fist sensor by the movable fixture;
   means including a second sensor stationary with respect to said first sensor that is spaced from the movable fixture and within the range of movement of the movable fixture for providing an error signal representative of any derivation of the movable fixture from said ideal fixture position as the measurable reference of the fixture position indicating means is moved relative to the second sensor by the movable fixture moving the sample relative the the first sensor; and
   means for cancelling from the measurement signal the error signal to provide an output signal compensated for deviations of the fixture from the ideal fixture position.

2. The invention of claim 1, wherein the movable fixture is an X, $\theta$, and Z movable assembly including a vacuum chuck for releasably mounting the sample.

3. The invention of claim 2, wherein the measurable reference of the fixture position indicating means is fixably mounted to the X, $\theta$, and Z movable assembly.

4. The invention of claim 3, wherein the measurable reference of the fixture position indicating means is a disc mounted for X, $\theta$ movement with said vaccum chuck.

5. The invention of claim 3, wherein the measurable reference of the fixture position indicating means is a bar mounted for X movement with said vacuum chuck.

6. The invention of claim 1, wherein the first and the second sensors include capacitive sensors.

7. The invention of claim 6, further including a sensor support, and wherein said sensors are mounted to said sensor support.

8. A sample measurement system compensated for non-repeatable errors, comprising:
   a sensor;
   a fixture;
   means for moving one of said sensor and said fixture relative to the other one of said sensor and said fixture to provide a sensor measurement signal of the sample from which one or more sample characteristics can be determined but which is subjected to error due to non-ideal position one of moved one of said sensor and said fixture which corrupts the sensor measurement signal and thereby reduces the accuracy of the senor measurement signal;
   reference position indicating means mounted for movement with the moved one of said sensor and said fixture moved by said moving means for providing a measurable reference that is indicative of ideal position of the moved one of said sensor and said fixture;
   means for providing an error signal representative of deviations of the measurable reference from the ideal position of the moved one of said sensor and said fixture; and
   means for compensating the measurement signal with the error signal to provide an output signal from which the one or more sample characteristics can be determined with a high degree of accuracy.

9. The invention of claim 8, wherein said fixture is movable relatively to said sensor.

10. The invention of claim 9, wherein said fixture includes a X, $\theta$, and Z movable vacuum chuck.

11. The invention of claim 10, wherein the error due to non-ideal fixture position is instantaneous, spontaneous positional deviation of the fixture that acts to dislocate the sample from its intended spacial position thereby inducing error into the measured data provided by the sensing element.

12. The invention of claim 11, wherein said measurable reference of said reference position indicating means includes a disc defining ideal position mounted for movement with the movable fixture, and said sensor is provided for for measuring distance relative to said disc.

13. The invention of claim 11, wherein said measurable reference of said reference position indicating means including a bar defining ideal position mounted for movement in X with the movable fixture, and a sensor for measuring distance relative to said bar.

14. The invention of claim 11, wherein said error signal providing means includes a sensing element, and wherein said compensating means includes electronic circuit means for producing a compensation signal that varies as the measurable reference departs from its ideal position as measured by said sensor.

15. A method for compensating for data corruption induced by positional irregularities of a fixture which receives and controllably moves an object into sensing proximity with a probe, the fixture having a reference fixably mounted thereto that indicates standard position of the fixture, and that is moved by and with the fixture comprising the steps of:

moving the fixture with respect to the probe so as to be successively bringing different portions of the object received by the fixture into sensing proximity with the probe to obtain measured data subject to corruption induced by positional irregularities of the fixture at each of the different portions of the object at which the measured data is obtained;

measuring any positional departure of the reference fixably mounted to the fixture from standard position as the different portions of the object are successively brought into sensing proximity with the probe; and cancelling the measured positional departure from the measured data.

16. The method of claim 15, wherein said cancelling step occurs in real-time.

17. Apparatus for compensating measured data provided by a data probe for any positional irregularities of a fixture which would otherwise corrupt the measured data, comprising:

means for moving the fixture with respect to the data probe to obtain the measured data by successively bringing different portions of an object to be measured that is releasably mounted to the fixture into sensing proximity with the data probe;

means for measuring any positional departure of the fixture from reference standard position as the different portions of the object are successively brought into sensing proximity with the data probe, said measuring means includes said reference standard defining said reference standard position mounted for movement with an by the fixture, and a reference standard probe stationary with respect to the data probe; and means for cancelling the measured positional departure from the measured data.

18. The apparatus of claim 17, wherein the cancelling means is operative in real time.

19. Apparatus providing data representative of a characteristic associated with an object, where the object is releasably mounted to an object receiving fixture that is movable relative to a probe, said apparatus providing said data with an accuracy very much better than the accuracy that would be obtained for a given mechanical tolerance of the object receiving fixture, comprising:

a probe having a sensing head for providing measured data representative of the characteristic associated with different portions of the object successively moved to the sensing head of the probe;

a movable fixture for receiving the object;

cyclically operative means coupled to said movable fixture and to said probe for controlling the movement of the movable fixture to successively bring different portions of the object received on the movable fixture controllably to the sensing head of the probe in a predetermined movement sequence that repeats measurement-cycle-to-measurement cycle thereby to obtain said measured data;

first means coupled to said cyclically operative means for compensating the measured data for errors that are attributable to repeatable positional variations from ideal fixture position of the movable fixture; and second means coupled to said cyclically operative means and cooperative with said first means for compensating the measured data for errors that are attributed to non-repeatable positional variations from ideal fixture position of the movable fixture, said second means includes a reference defining a standard position mounted for movement with and by the movable fixture, and a probe for providing error data representative of deviation of the actual position of the movable fixture from the standard position thereof.

20. The apparatus of claim 19, wherein the second means is operative in real time.

* * * * *

UNITED STATES PATENT AND TRADEMARK OFFICE
CERTIFICATE OF CORRECTION

PATENT NO. : 4,931,962
DATED : June 5, 1990
INVENTOR(S) : Benjamin Palleiko It is certified that error appears in the above-identified patent and that said Letters Patent is hereby corrected as shown below:

Column 4, line 26, "indicated" should read --dedicated--.

Column 6, line 6, "vaccum" should read --vacuum--.

Column 6, line 62, "including" should read --includes--.

Column 7, line 42, "an" should read --and--.

Column 8, line 34, "atrributed" should read --attributable--.

Signed and Sealed this

Twenty-second Day of September, 1992

Attest:

DOUGLAS B. COMER

*Attesting Officer*    *Acting Commissioner of Patents and Trademarks*